Inventor
David M. Ashkenaz

Sept. 2, 1941.　　　　D. M. ASHKENAZ　　　　2,254,833
METHOD AND APPARATUS FOR CONTROLLING INTERMITTENT FLUID FLOW
Filed June 27, 1940　　　3 Sheets-Sheet 2
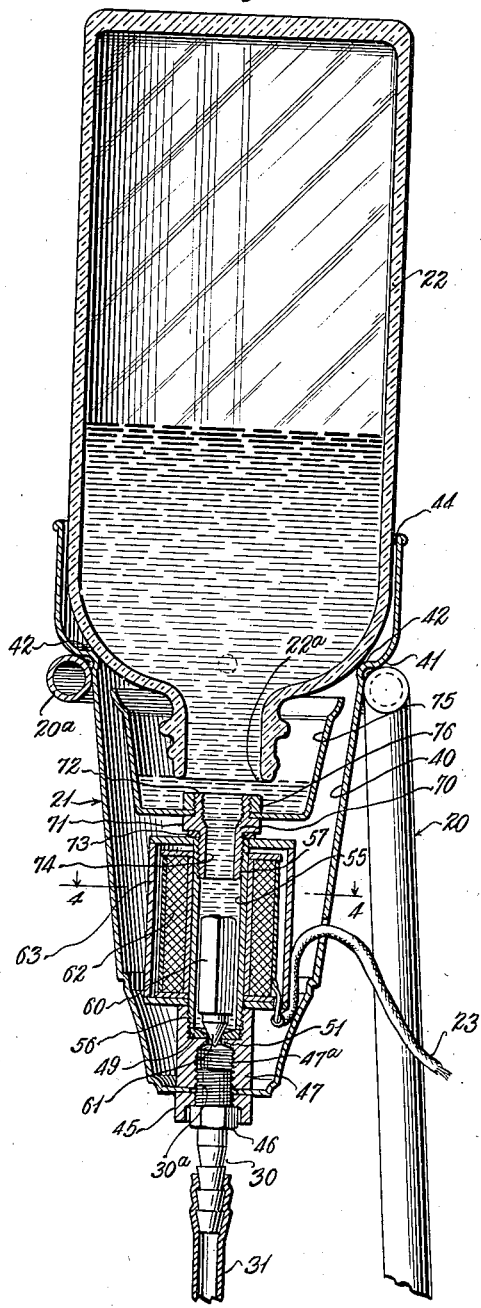
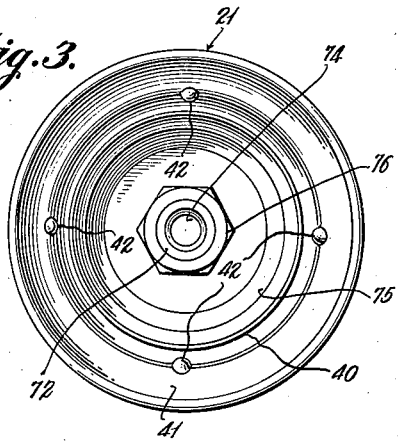
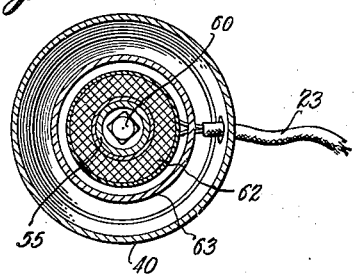
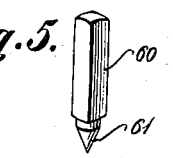
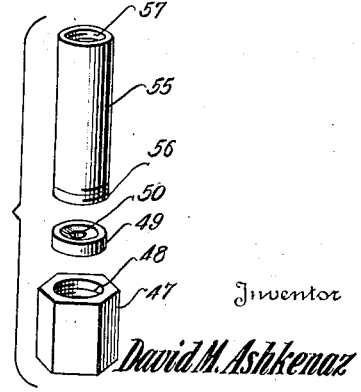
Inventor
David M. Ashkenaz
By Browne & Phelps
Attorneys

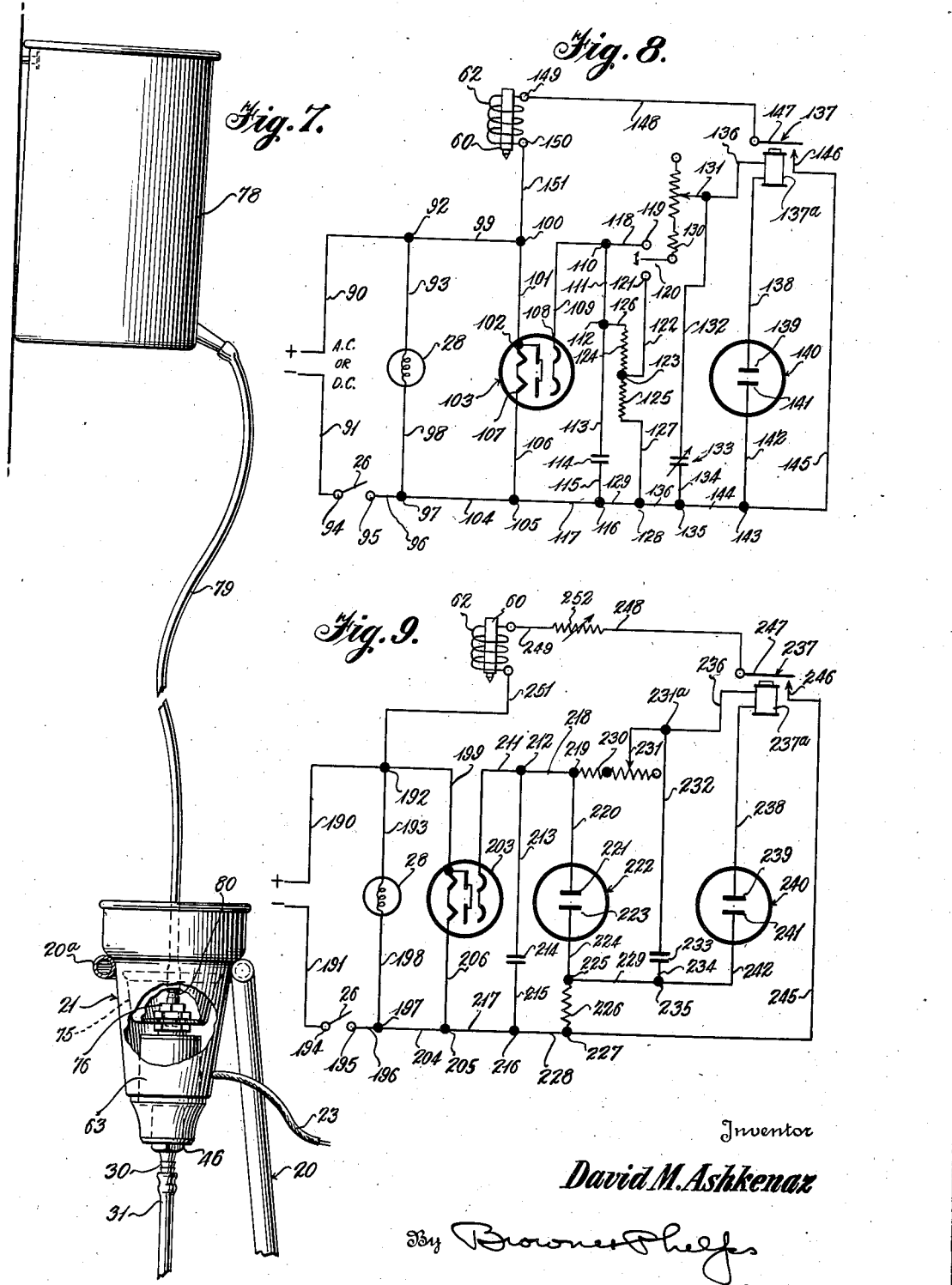

Patented Sept. 2, 1941

2,254,833

UNITED STATES PATENT OFFICE 2,254,833

METHOD AND APPARATUS FOR CONTROLLING INTERMITTENT FLUID FLOW

David M. Ashkenaz, Philadelphia, Pa., assignor to John Wyeth and Brother, Incorporated, Philadelphia, Pa., a corporation of Delaware Application June 27, 1940, Serial No. 342,787

15 Claims. (Cl. 128—213)

This invention relates to a method of, and apparatus for, controlling the intermittent or periodic flow of fluids, and more particularly, to the control of such flow in apparatus such as medicinal dosing devices.

A primary object of this invention is the provision of an accurate method of determining both the periodicity and quantity of a periodic fluid flow with the provision of an apparatus to accomplish such method in a reliable and efficient manner.

A secondary object of this invention is the provision of an accurate method of determining and introducing into an animate body, without the necessity for manual intervention, an accurate quantity of medicinal fluid at precisely timed intervals, and the provision of an apparatus to accomplish this in a reliable and efficient manner.

More specific objects include the provision of a method of control of an apparatus as herebefore mentioned including the use of a solenoid or analogous device actuated by a predetermined influx of electrical potential to energize the same and an apparatus for so doing.

Additional objects reside in the methods of specific operation and the specific apparatus for accomplishing such methods, as will be more fully pointed out hereinafter.

As conducive to a clearer understanding of this invention, it may here be pointed out that numerous medicinal treatments require the introduction of predetermined quantities of fluid at predetermined intervals into the human body. Various medicinal preparations and various methods of introduction are currently utilized. The most common of the latter include the oral (or nasal) introduction of fluid to the stomach, intravenous injection directly into the blood stream (in some cases injection into the muscles) and rectal injection into the lower gastro-intestinal tract. Various methods of regulating the quantity and timing of such injections have hitherto been employed, some with varying degrees of success, in such cases as permitted a wide tolerance with respect to both time and quantity. However, in those cases requiring great exactitude as to dosage, the constant attendance of a physician or other qualified attendant has been almost mandatory. It is an object of this invention therefore, to provide a method of precise control of both timing and quantity of medicament in injections such as above specified, together with an apparatus for the execution of the said method which will operate with such precision and exactitude as to require a minimum of attention during the introduction of fluids into the body.

While the method and apparatus hereinafter described and shown in the accompanying drawings is specific to the introduction of fluids as associated with medicinal dosing devices, it is to be understood that both method and apparatus may likewise be employed in any capacity where it is desirable that the periodic flow of fluids be accurately controlled, as for example, in the introducing of chemical reagents in commercial chemical production or laboratory experiments, in the filling of ampules, in artificial respiration and in a large variety of other uses.

Other objects will in part be obvious and in part pointed out hereinafter.

The invention therefore consists in the method hereinafter described, together with the combinations of elements, features of construction and arrangements of parts, all as will be more fully pointed out hereinafter and illustrated in the accompanying drawings, wherein:

Fig. 2 is an enlarged sectional view of certain of the apparatus shown in Fig. 1 illustrating certain operating mechanism;

Fig. 3 is a top plan view of one portion of the apparatus shown in Fig. 2;

Fig. 4 is a sectional view taken substantially along the line 4—4 of Fig. 2;

Fig. 5 is a perspective view of one of the operating elements shown in Fig. 2;

Fig. 6 is a perspective of certain additional elements cooperating with that shown in Fig. 5;

Fig. 7 is a side elevational view, partially in section of a modified form of the apparatus;

Fig. 8 is a schematic diagram of one form of actuating circuit for the device; and Fig. 9 is a schematic diagram of an alternative form of actuating circuit.

Similar reference characters refer to similar parts throughout the several views of the drawings.

Figure 1:
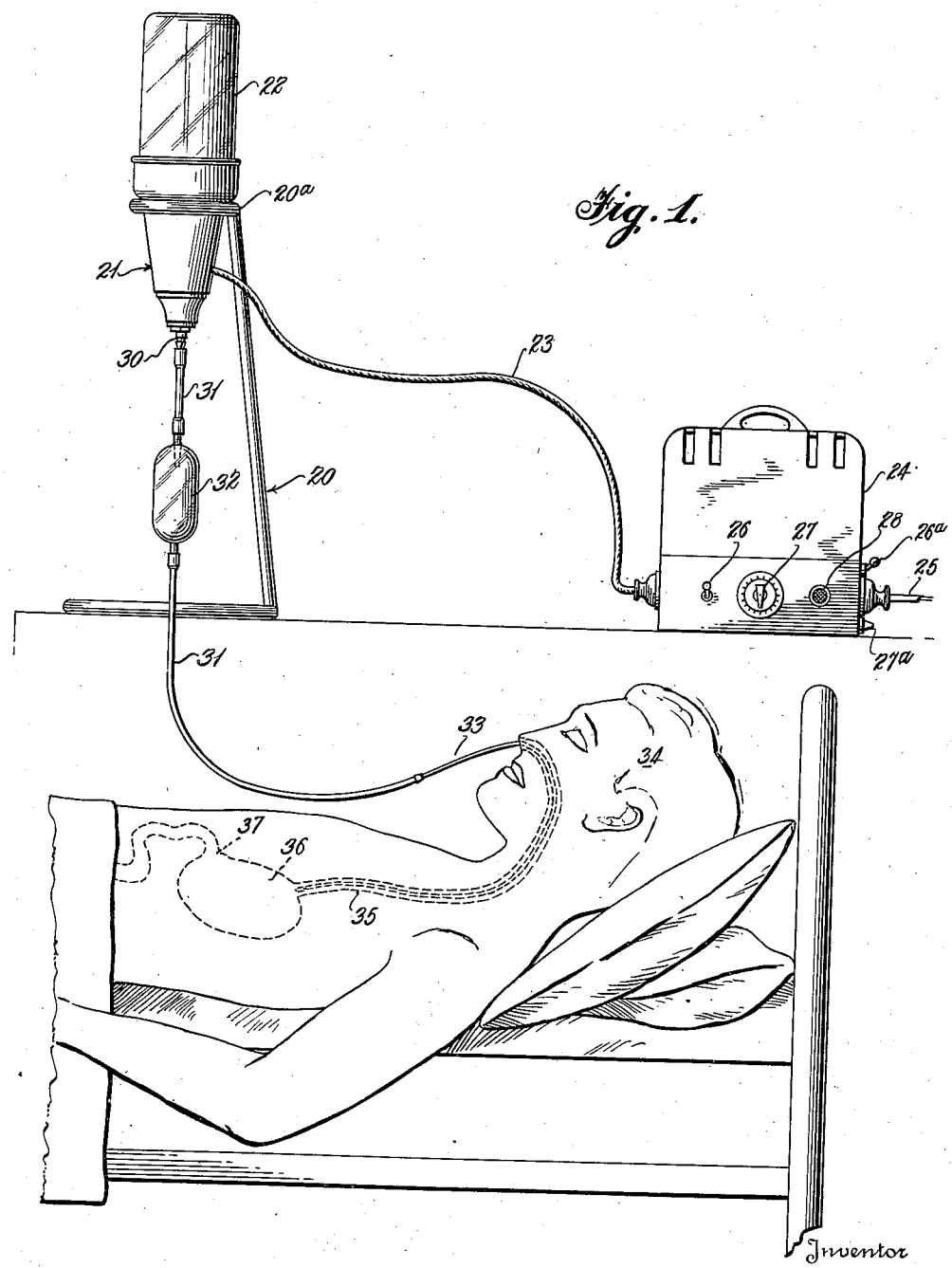
Fig. 1 is a diagrammatic view, partially in section, disclosing one form of apparatus in association with a patient.

Having reference now particularly to Fig. 1, wherein is shown one form of the apparatus provided with accessories to permit the introduction of fluid to the stomach of a patient through the nasal passage, there is generally indicated at 20 a supporting frame which carries on a circular rim 20a, a device generally indicated at 21, containing a valve mechanism, to be more fully described hereinafter. Device 21 in turn supports a fluid reservoir 22, containing a medicinal fluid, and is connected by an electrical cable 23 with a control box 24. Control box 24 is supplied with power through a cable 25, and is provided with two switch actuating devices 26 and 26a, two control knobs 27 and 27a, and a pilot light 28, the purpose of which will be more fully pointed out hereinafter.

From a nipple 30, at the lower extremity of device 21, a drip tube 31 leads to an expansion chamber 32, of known type, and thence to a flexible discharge nozzle 33, shown in the instant illustration as passed through the nasal passage of a patient 34, thence through the esophagus 35, to the stomach 36, or the duodenum 37, whereby the passage of fluid directly into the stomach or duodenum is permitted. Thus it will be seen that fluid from reservoir 22 passes through device 21 in quantity, and at intervals determined, in a manner to be hereinafter described, by means of control box 24, through tube 31, into the system of patient 34.

Having reference now to Figures 2 to 6, inclusive, wherein device 21 is shown in detail, it will be seen that device 21 comprises an inverted bell-shaped member 40, flared as at 41 to provide a shoulder to permit the engagement of support 20a and which is provided with a plurality of internal projections 42 in turn supporting reservoir 22.

It may here be pointed out that the upper portion of member 40 is slightly greater in circumference than is reservoir 22, providing an air space 44, the purpose of which will be hereinafter described.

An aperture in the base of member 21 permits the introduction of the threaded end portion 30a of nipple 30, which has threaded thereon, for adjustment purposes, a knurled nut 45 held in place by a lock nut 46.

A hexagonal nut 47, having an internally threaded bore 47a is in turn threaded on portion 30a, within member 21, holding these parts in related assembly. The upper portion of nut 47 is bored as at 48 and tapped a portion of the depth of the bore to provide a recess in which is positioned a valve seat 49, preferably of rubber (see Fig. 6), having an aperture 50 therethrough. A supplemental bore 51 of substantially the same diameter as aperture 50 permits, when valve seat 49 is unobstructed, the free passage of fluid into tube 31.

Into the tapped portion of bore 48 is screwed a sleeve 55 threaded externally as at 56, and at its opposite end internally as at 57.

A metallic member 60 (see Fig. 5) rectangular in cross section, provided at its lower extremity with a conical pointed member 61, serving as a valve, is positioned within sleeve 55, and adapted to engage and disengage valve seat 49 to open and close the valve. Note that in Fig. 2 the valve is shown in closed position. The rectangular cross section of the upper portion of member 60 permits free passage of fluid into sleeve 55.

Surrounding sleeve 55 is a coil 62, contained in a housing 63 secured in any desired manner to sleeve 55. Cable 23 is in turn connected to coil 62.

Thus it will be seen that member 60 forms the core of a solenoid and upon energization of coil 62, is adapted to be withdrawn upward to open valve 61—49, permitting fluid to pass therethrough. Upon deenergization of coil 62, gravity causes member 60 to fall, effectively closing the valve.

Threaded into threaded portion 57 of sleeve 55 is a nut 70 provided with a flange 71 and an upwardly extending threaded portion 72. A washer 73 is positioned between housing 63 and flange 71. A bore 74 passes through the interior of nut 70 forming a fluid passage.

A cup 75 is seated on flange 71 and held rigidly in position by a lock nut 76. It should be noted that the orifice 22a of reservoir 22 is positioned a slight distance above the bottom of cup 75 whereby a fluid pool is formed in cup 75 upon the equalization of external and internal hydrostatic pressure. This pool together with air passage 44 permits a continuous flow of fluid, regardless of back pressure, by a bubble-through action, in a known manner.

It may here be pointed out that the modification shown in Figure 7 is in all respects similar to that of Figs. 2 to 6, inclusive, with the exception that a substitute reservoir 78 is positioned well above device 21 and connected thereto by a flexible tube 79 which in turn is secured to a nipple 80 held in place by lock nut 76.

This construction is utilized in those cases where it is desirable that the fluid in the reservoir be introduced into the body at relatively high pressure, and as will be readily understood, an increase in the height of the reservoir above the patient will increase such pressure to any desired degree in accordance with such height.

Having reference now to Fig. 8, there is disclosed, schematically one form of actuating circuit which may be contained in control box 24. Cable 25 contains two wires 90 and 91, leading from any desired source of electrical input. Wire 90 leads to a terminal 92 from which a wire 93 leads to one side of pilot light 28. Wire 91 leads to a terminal 94 which comprises the movable contact of switch 26. From the fixed contact 95 of switch 26 a wire 96 leads to a terminal 97 from which a wire 98 leads to the other side of pilot light 28. Thus it will be seen that upon closure of switch 26, pilot light 28 is illustrated.

From terminal 92 a wire 99 leads to a terminal 100 from which a wire 101 leads to the anode and to the filament terminal 102 of a conventional rectifier tube 103. A wire 104 leads from terminal 97 to a terminal 105 from which a wire 106 leads to the other filament terminal 107 of tube 103. From the cathode terminal 108 of tube 103, a wire 109 leads to a terminal 110 from which, in turn, a wire 111 leads to a terminal 112. From terminal 112, a wire 113 leads to a fixed condenser 114, from the other side of which a wire 115 leads to a terminal 116. A wire 117 connects terminals 116 and 105.

From terminal 110, a wire 118 leads to the D. C. terminal 119 of an A. C.-D. C. switch 120, the control member of which is designated by 26a (see Fig. 1). The A. C. terminal 121 of switch 120 is connected by a wire 122 to a tap terminal 123 of a fixed resistance comprised of two associated resistance elements 124 and 125, forming a potentiometer. From element 124, a wire 126 leads to terminal 112, and from element 125, a wire 127 leads to a terminal 128, which is connected by a wire 129 with terminal 116.

Switch 120 is directly connected to an adjustable resistance coil 130 associated with a movable member 131, the control knob of which is designated by the reference character 27. From member 131, a wire 132 leads to one side of a variable condenser 133 (adapted to be varied by control knob 27a) from the other side of which a wire 134 leads to a terminal 135 which is connected by a wire 136 with terminal 128.

From member 131 a wire 136 leads to one terminal of a coil 137a, of a relay 137 from the other terminal of which a wire 138 leads to the cathode 139 of a glow discharge tube 140, from the anode 141 of which a wire 142 leads to a terminal 143, connected by a wire 144 with terminal 135. From terminal 143, a second wire 145 leads to a fixed contact 146, adapted to be engaged by the arm 147 of relay 137, from which arm a wire 148 leads to one terminal 149 of solenoid coil 62. From the other terminal 150 of coil 62, a wire 151 leads to terminal 100.

The operation of the circuit should now be apparent to one skilled in the art.

Assuming A. C.-D. C. switch 120 to be in the A. C. position, and switch 26 in closed position, pilot light 28 is illuminated as above described. Electrical potential flows through wire 90, terminal 92, wire 99, terminal 100, wire 101, terminal 102, the anode of tube 103, to the cathode thereof, terminal 108, wire 109, terminal 110, wire 111, terminal 112, wire 113, to condenser 114, thus charging condenser 114 to serve as a source of direct electrical potential for the remainder of the system.

The potential from condenser 114 is then applied via wire 113, terminal 112, wire 126, coil 124, terminal 123, wire 122, terminal 121, switch 120, coil 130, element 131, and wire 132 to variable condenser 133, coil 125, and wire 127, serving to form a bleeder circuit, charging condenser 133 to a predetermined point. When the charge on condenser 133 reaches the discharge potential of tube 140, potential flows therefrom through wire 134, terminal 135, wire 144, terminal 143, wire 142, anode 141, cathode 139, wire 138, relay coil 137a and wire 136, back to element 131, completing in a manner readily understandable, a circuit through coil 137a to close relay 137. Upon closure of relay 137, arm 147 engages contact 146, whereupon a circuit, comprising the source of power, wire 90, terminal 92, wire 99, terminal 100, wire 151, terminal 150, coil 62, terminal 149, wire 148, arm 147, contact 146, wire 145, terminal 143, wire 144, terminal 135, wire 136, terminal 128, wire 129, terminal 116, wire 117, terminal 105, wire 104, terminal 97, wire 96, contacts 95 and 94, and wire 91 back to the source of power, energizes coil 62 to lift core 60 and hence permit the flow of fluid through the valve, comprised of closure member 61 and valve seat 49.

It will also be readily understood that adjustment of element 131 varying the resistance of coil 130 varies the length of time required to charge condenser 133, and hence the duration of the time intervals between discharges of glow tube 140, and consequent opening of the valve.

It will also be understood that variation of condenser 133 will control the quantity of current discharged therefrom to tube 140, and hence the period of time required for tube 140 to discharge, thus controlling the time relay 137 is closed and consequently the period of time the valve remains open, thus regulating the quantity of fluid passed at each discharge.

When the A. C.-D. C. switch is in D. C. position, it will be understood that the operation is substantially the same with the exception that rectifier tube 103 performs no active function and current flows from condenser 114 through wire 113, terminal 112, wire 111, terminal 110, wire 118, terminal 119, directly to switch 120, as in the case of direct current the necessity for resistance elements 124 and 125 is eliminated.

Having reference now to Fig. 9 wherein is disclosed an alternative form of control circuit, cable 25 contains, as in the foregoing example, two wires 190 and 191, one of which leads to a terminal 192 from which a wire 193 leads to pilot light 28, and the other of which leads through switch contacts 194 and 195, wire 196, terminal 197, and wire 198 also to pilot light 28 in a manner identical to that previously described. From terminal 192 a wire 199 leads to a rectifier tube 203, from which, in turn, a wire 211 leads to a terminal 212, from which a wire 213 leads to a condenser 214. From the other side of condenser 214 a wire 215 leads to a terminal 216, from which a wire 217 leads to a terminal 205, from which wires 204 and 206 lead respectively to terminal 197 and tube 203.

Heretofore the circuit has been substantially identical to that hereinbefore set out. Now, however, from terminal 212, a wire 218 leads to a terminal 219, associated with the coil 230 of an adjustable resistance element. From terminal 219 a wire 220 leads to the cathode 221 of a voltage regulator tube 222, from the anode 223 of which a wire 224 leads to a terminal 225, to which is attached one end of a fixed resistance 226, the other end of which is attached to a terminal 227, connected by a wire 228 to terminal 216. Likewise, from terminal 225, a wire 229 leads to a terminal 235, from which a wire 234 leads to a condenser 233, which in this case may be of the fixed type. From condenser 233 a wire 232 leads in turn to a terminal 231a, to which is secured the movable element 231 of the adjustable resistance including coil 230.

It will thus be understood that either direct or alternating current may be directed through rectifier 203 to condenser 214, which potential then passes through wire 215, terminal 216, wire 228, terminal 227, resistance 226 (which serves only to prevent an overload on tube 222), terminal 225 and wire 224, to anode 223. The voltage regulator functioning in a known manner then passes, through cathode 221, wire 220, and terminal 219, current of constant predetermined voltage to resistance coil 230.

The remainder of the relay circuit, comprising a wire 236, leading from terminal 231a to relay coil 237a, from which a wire 238 leads to cathode 239 of a glow discharge tube 240, from the anode 241 of which in turn a wire 242 leads to terminal 235, is substantially identical to that previously described, and functions in an identical manner.

The circuit to the solenoid coil comprises, when relay 237 is closed, the source of current, wire 191, switch contacts 194 and 195, wire 196, terminal 197, wire 204, terminal 205, wire 217, terminal 216, wire 228, terminal 227, a wire 245, a contact 246, an arm 247, a wire 248, a variable resistance 252, the purpose of which will be hereinafter pointed out, a wire 249, solenoid coil 62, a wire 251, terminal 192 and wire 190 back to the source of current.

In the instant illustration variable resistance 252 may be varied to control the quantity of current admitted to solenoid coil 62 whereby the degree of lift imparted to core 60 may be controlled, since the lifting power of the solenoid is dependent on the current passed therethrough, thus in turn controlling the quantity of fluid discharged.

As variable resistance 252 serves, in an alternative manner, substantially the same purpose as variable condenser 133 (see Fig. 8) it may be controlled from the exterior of control box 24 by control knob 27a, since in this type of circuit fixed condenser 233 requires no external control.

Now from the foregoing it will be seen that there is herein provided a method of, and apparatus for, accomplishing all the objects of this invention, and others including many advantages of great practical utility.

Since many embodiments may be made of this invention, and since many modifications may be made in the embodiments herein described and shown in the accompanying drawings, it is to be understood that all matter hereinbefore shown and/or described is to be interpreted merely as illustrative and not in a limiting sense.

I claim:

1. In an apparatus for periodically introducing fluids into an animate body, the combination of reservoir, a means of bodily introduction, a flow control means therebetween, and means for controlling said flow control means, said last mentioned means including means for introducing periodic impulses of electrical potential to said first mentioned means.

2. In an apparatus for periodically introducing fluids into an animate body, the combination of a reservoir, a means of bodily introduction, a flow control means therebetween, means for controlling said flow control means, said last mentioned means including means for introducing periodic impulses of electrical potential to said first mentioned means, and means for selectively varying the intervals between said periodic impulses to vary the interval between operations of said flow control means.

3. In an apparatus for periodically introducing fluids into an animate body, the combination of a reservoir, a means of bodily introduction, a flow control means therebetween, means for controlling said flow control means, said last mentioned means including means for introducing periodic impulses of electrical potential to said first mentioned means, and means for selectively varying the duration of said impulses to vary the duration of the operating period of said flow control means.

4. In an apparatus for periodically introducing fluids into an animate body, the combination of a reservoir, a means of bodily introduction, a flow control means therebetween, means for controlling said flow control means, said last mentioned means including means for introducing periodic impulses of electrical potential to said first mentioned means, means for selectively varying the intervals between said periodic impulses to vary the interval between operations of said flow control means, and means for selectively varying the duration of said impulses to vary the duration of the operating period of said flow control means.

5. In an apparatus for periodically introducing a fluid into an animate body, the combination of a fluid reservoir, a means of bodily introduction, a solenoid actuated flow control means therebetween, and means for the introduction of periodic impulses of electrical potential to control the actuation of said solenoid, and said flow control means.

6. In an apparatus for periodically introducing a fluid into an animate body, the combination of a reservoir for said fluid, a means for introducing the same into said body, a solenoid actuated flow control means therebetween, means for introducing periodic impulses of electrical potential to said solenoid, and means for varying the interval between said impulses to vary the interval between said periods.

7. In an apparatus for periodically introducing a fluid into an animate body, the combination of a reservoir for said fluid, a means for introducing the same into said body, a solenoid actuated flow control means therebetween, means for introducing periodic impulses of electrical potential to said solenoid, and means to vary the duration of said impulses to vary the length of the period of operation of said flow control means.

8. An apparatus for the periodic introduction of fluids into an animate body, comprising in combination; a reservoir for said fluid, a means for introducing said fluid into said body, a solenoid actuated flow control means therebetween, and means including a glow tube adapted to discharge upon potential overload, periodically to energize said solenoid to open said flow control means.

9. An apparatus for the periodic introduction of fluids into an animate body, comprising in combination; a reservoir for said fluid, a means for introducing said fluid into said body, a solenoid actuated flow control means therebetween, means including a glow tube adapted to discharge upon potential overload, periodically to energize said solenoid to open said flow control means, and means for varying the potential applied to discharge said tube.

10. An apparatus for the periodic introduction of fluids into an animate body, comprising in combination; a reservoir for said fluid, a means for introducing said fluid into said body, a solenoid actuated flow control means therebetween, means including a glow tube adapted to discharge upon potential overload, periodically to energize said solenoid to open said flow control means, and means for varying the time required to charge said tube.

11. An apparatus for the periodic introduction of fluids into an animate body, comprising in combination; a reservoir for said fluid, a means for introducing said fluid into said body, a solenoid actuated flow control means therebetween, means including a glow tube adapted to discharge upon potential overload, periodically to energize said solenoid to open said flow control means, and means for varying the rate of charge and discharge of said tube.

12. An apparatus for the periodic introduction of fluids into an animate body, comprising in combination; a reservoir for said fluid, a means for introducing said fluid into said body, a solenoid actuated flow control means therebetween, means including a glow tube adapted to discharge upon potential overload, periodically to energize said solenoid to open said flow control means, and means for varying the rate of charge and discharge of said tube, said last mentioned means including manually operable electrical elements in the circuit of said tube.

13. An apparatus for the control of the periodic flow of fluids, including a valve, a solenoid adapted to actuate said valve, a glow discharge tube adapted to actuate said solenoid, means for introducing electrical potential to said tube to discharge the same to actuate said valve, and means for varying the rate of discharge of said tube to vary the duration of the operating period of said solenoid and hence said valve.

14. An apparatus for the control of the periodic flow of fluids, including a valve, a solenoid adapted to actuate said valve, a glow discharge tube adapted to actuate said solenoid, means for introducing electrical potential to said tube to discharge the same to actuate said valve and means for varying the potential applied to charge said tube whereby the duration of intervals between discharges thereof and consequent actuation of said valve may be varied.

15. An apparatus for the control of the periodic flow of fluids, including a valve, a solenoid adapted to actuate said valve, a glow discharge tube adapted to actuate said solenoid, means for introducing electrical potential to said tube to discharge the same to actuate said valve and means for selectively varying both the period required to charge and to discharge said tube whereby the actuated periods of said valve and the intervals therebetween may be varied.

DAVID M. ASHKENAZ.